(12) United States Patent
Lee

(10) Patent No.: US 9,226,075 B2
(45) Date of Patent: Dec. 29, 2015

(54) COMMUNICATION TERMINAL HAVING BONE CONDUCTION FUNCTION

(76) Inventor: Sang Chul Lee, Gyeonggi-do (KR)

( * ) Notice: Subject to any disclaimer, the term of this patent is extended or adjusted under 35 U.S.C. 154(b) by 64 days.

(21) Appl. No.: 13/983,245

(22) PCT Filed: Jul. 19, 2011

(86) PCT No.: PCT/KR2011/005308
§ 371 (c)(1),
(2), (4) Date: Aug. 1, 2013

(87) PCT Pub. No.: WO2012/105735
PCT Pub. Date: Aug. 9, 2012

(65) Prior Publication Data
US 2013/0308798 A1 Nov. 21, 2013

(30) Foreign Application Priority Data
Feb. 1, 2011 (KR) .................. 10-2011-0010278

(51) Int. Cl.
*H04R 25/00* (2006.01)
*H04R 9/02* (2006.01)
(Continued)

(52) U.S. Cl.
CPC . *H04R 9/02* (2013.01); *H04M 1/03* (2013.01); *H04M 1/0266* (2013.01); *H04M 1/23* (2013.01); *H04R 11/06* (2013.01); *H04R 2499/11* (2013.01); *H04R 2499/15* (2013.01)

(58) Field of Classification Search
CPC ............... H04R 11/00; H04R 2460/13; H04R 2499/11; H04R 17/00; H04R 25/606; H04R 1/02; H04R 2400/03; H04R 2499/15; H04R 2420/07; H04R 5/0335; H04R 7/04; H04R 11/06; H04R 17/005; H04R 1/10; H04R 1/105; H04M 1/02
USPC .................................. 381/151, 386, 388, 333
See application file for complete search history.

(56) References Cited

U.S. PATENT DOCUMENTS 6,141,427 A * 10/2000 Fukuda ..................... 381/151
2012/0243719 A1 * 9/2012 Franklin et al. ............ 381/333

FOREIGN PATENT DOCUMENTS

JP 10-003702 A 1/2007
KR 10-0119613 A 12/2007
(Continued)

OTHER PUBLICATIONS

International Search Report for PCT/KR2011/005308 dated Mar. 23, 2012.

*Primary Examiner* — Sunita Joshi
(74) *Attorney, Agent, or Firm* — Andrus Intellectual Property Law, LLP

(57) ABSTRACT

The present invention relates to a communication terminal having a bone conduction function. To this end, the present invention provides a communication terminal having a bone conduction function equipped with a bone conduction vibration receiver/speaker (300) for converting a sound signal (electric signal) into a vibration, so as to enable sound reception from the entire front surface of the communication terminal when the communication terminal closely contacts the face, and having at least one thereof attached to the rear surface of an inner liquid crystal screen (401) or liquid crystal panel (402) of the communication terminal (example: smartphone, Galaxy Tab, Galaxy Phone, cellular phone, PDA, MP3, iPhone, iPad, walkie-talkie, et cetera) (400). Also, provided is a communication terminal having a bone conduction function, comprising a bone conduction vibration no-noise microphone (200) having at least one thereof attached to the inner top section of the communication terminal (example: smartphone, Galaxy Tab, Galaxy Phone, cellular phone, PDA, MP3, iPhone, iPad, walkie-talkie, et cetera) (400), for enabling transmission/reception of the voice of a person on the phone regardless of the surrounding noise using a bone conduction microphone function when the communication terminal closely contacts the face, and for converting minute vibrations into a sound signal (electric signal).

6 Claims, 8 Drawing Sheets

(51) Int. Cl.
*H04M 1/03* (2006.01)
*H04R 1/02* (2006.01)
*H04M 1/02* (2006.01)
*H04M 1/23* (2006.01)
*H04R 11/06* (2006.01)

(56) References Cited

FOREIGN PATENT DOCUMENTS

KR  10-0084498 A  9/2008
KR  10-0120951 A  11/2009

* cited by examiner

COMMUNICATION TERMINAL HAVING BONE CONDUCTION FUNCTION

CROSS-REFERENCE TO RELATED APPLICATION

The present application is the U.S. national state application of International Application PCT/KR2011/005308, file Jul. 19, 2011, which international application was published on Aug. 9, 2012, as International Publication WO2012/105735. The international application claims the benefit of Korean Patent Application No. 10-2011-0010278, filed on Feb. 1, 2011 in the Korean Intellectual Property Office, the contents of which are incorporated herein by reference in their entireties.

TECHNICAL FIELD

The present invention relates to a communication terminal having a bone conduction function, and more particularly, to a communication terminal having a bone conduction function that can form an entire front surface of the terminal into a screen window by removing a receiver hole (speaker) provided at the front surface of a conventional communication terminal (e.g., a smart phone, a Galaxy Tab, a Galaxy Phone, a mobile phone, a personal digital, assistant (PDA), a moving picture experts group layer-3 (MP3), an iPhone, an iPad, and a wireless set) and that can receive sound at the entire front surface of the terminal by attaching a vibrator to a liquid crystal screen or a front panel of the terminal and that can receive sound of high sensitivity with a bone conduction function when close contacting with the terminal with an ear or a peripheral portion of an ear of a face and that can transmit only a communicating person's voice regardless of peripheral noise, thereby providing a good image to a consumer by greatly improving a quality and reliability of a product.

BACKGROUND ART

As shown in FIG. 1, in a conventional mobile communication terminal 1, at a position of an upper portion of the mobile communication terminal 1 contacting with a user's ear, a speaker unit 10 is formed, and at a position of a lower portion of the mobile communication terminal 1 adjacent to the user's mouth, a microphone 40 is formed, and at a front surface thereof, a liquid crystal display (LCD) 20 as a display unit that outputs a driving state of the mobile communication terminal 1 and a keypad 30 for inputting the user's control command are generally disposed.

In the above-described configuration, the speaker unit 10 is shown in FIG. 2, and the speaker unit 10 includes a speaker 11, an external frame 12 for supporting and protecting the speaker, and a decoration portion 13 formed in a shape such as a convex circular arc shape using a material such as a steel material having luster in a central portion of the external frame for decoration. A controller 2 of the mobile communication terminal 1 formed with a micro controller unit (MCU) or a mobile station modem (MSM) outputs an audio signal received by an RF signal through a vcoder and a digital analog converter (DAC) or an audio signal by reproduction of a multimedia file, and the speaker 11 is vibrated by receiving an input of an audio signal in which the controller 2 outputs and operates to output a sound signal.

However, as described above, in the conventional mobile communication terminal 1, because a user can adjust a magnitude of a output sound volume of the speaker, but even when the output sound volume of the speaker is set to be small, another party may still hear output sound of the speaker and thus there is a problem that the user's private life is not protected.

Further, the conventional mobile communication terminal has a problem that the user cannot appropriately recognize another party's voice or audio sound of reproduced multimedia due to interference by noise at a location having serious noise.

As conventional art for solving the above problem, Korean Patent No. 0687265 (Korean Patent Application No. 2005-0050222) (title: A mobile communication terminal having a bone conduction speaker and the operating method thereof) is disclosed.

That is, as shown in FIGS. 3, 4, and 5, in the conventional art, at a position of an upper portion of a mobile communication terminal 100 contacting with the user's ear, an audio speaker unit 110 is formed, and at a position of a lower portion of the mobile communication terminal 100 adjacent to the user's mouth, a microphone 140 is formed, and at a front surface thereof, an LCD 120 as a display unit for outputting a driving state of the mobile communication terminal 100 and a keypad 130 for inputting a user control command are disposed, and at an adjacent position of the audio speaker unit 110, a bone conduction speaker unit 150 is provided.

The mobile communication terminal 100 includes a controller 101 including an MSM or an MCU for outputting a switching unit control signal that controls voice and data communication by the mobile communication terminal and that outputs an audio signal and that selectively drives the audio speaker unit 110 and the bone conduction speaker unit 150. In an audio signal output terminal of the controller 101, a switching unit 160 for outputting an audio signal by selecting the audio speaker unit 110 and the bone conduction speaker unit 150 is provided, and the controller 101 and the switching unit 160 have a structure that connects an audio signal line 102 for outputting an audio signal and a switching unit control signal line 103 for outputting a switching signal to the switching unit 160. The switching unit 160 includes an audio speaker terminal 161 and a bone conduction speaker terminal 162 and is switched according to a switching signal of the controller 101 to selectively output an audio signal to the audio speaker unit 110 or the bone conduction speaker unit 150. A speaker 111 of the audio speaker unit 110 is connected to the audio speaker terminal 161 of the switching unit 160, and the bone conduction speaker unit 150 is connected to the bone conduction speaker terminal 162 of the switching unit 160. Here, the above-described bone conduction speaker unit 150 transfers a vibration of a bone of a side surface of the user's face to a cochlea of a screw shape positioned at the inside of an eardrum instead of directly inserting into the user's ear and thus the user can recognize sound.

Next, the audio speaker unit 110 includes a speaker 111 and an external frame 112 having a hollow portion and mounted at a front surface of the speaker unit 110 to protect the speaker 111, and in the hollow portion of the external frame 112, a pressing button 113 is supported by a spring 114, and in a lower end portion of the pressing button 113, when the pressing button 113 is pressed, a ground switch 115 that outputs a ground signal to the controller 101 is provided. One end of the ground switch 115 is grounded, and the other end thereof has a structure connected to the controller 101 to be parallel to a reference voltage source VCC. The above-described spring 114 may be replaced with an elastic member of various forms and materials that can provide an elastic force to the pressing button 113.

In the mobile communication terminal 100 having the above-described bone conduction speaker, a method of driving a mobile communication terminal by a selective operation of the audio speaker unit 110 and the bone conduction speaker unit 150 will be described as follows.

First, in a general state, the switching unit 160 of the mobile communication terminal 100 maintains a state in which an audio signal is input to the audio speaker unit 110 (S10). Thereafter, the controller 101 determines whether the pressing button 113 is pressed (S20). By enabling the user to contact the audio speaker unit 110 with a periphery of an ear or a jaw, if the pressing button 113 is pressed, the ground switch 115 is switched to be grounded and thus a low signal is output to the controller 101. When the controller 101 senses pressing of the pressing button 113 by a low signal, the controller 101 outputs a switching control signal that enables the switching unit 160 to be switched to the bone conduction speaker unit 150 through the switching signal line 103. The switching unit 160, having received an input of the switching control signal is switched to input an audio signal input through the audio signal line 102 to the bone conduction speaker unit 150. Thereby, the user can hear an audio signal through a bone conduction speaker without an output of a sound signal, but another party cannot hear a sound signal and thus a private life of the user can be protected (S30). Thereafter, the controller 101 determines whether pressing of the pressing button 113 is released (S40). If pressing of the pressing button 113 is not released, by maintaining a present switching state to the bone conduction speaker unit 150, after outputting audio through the bone conduction speaker unit 150, the controller 101 determines whether pressing of the pressing button is released (S50). Alternatively, as the user separates the audio speaker unit 110 from a contact portion of a periphery of an ear or a jaw bone, the pressing button 113 is returned to an original position by the spring 114 and thus if pressing of the pressing button 113 is released at step S40, a ground switch is separated from the ground and thus a high signal is input again to the controller 101 by the reference voltage source VCC. The controller 101, having received an input of a high signal again outputs a switching control signal for switching to the audio speaker unit 110 to the switching unit 160 and thus the switching unit 160 is switched and is operated to output an audio signal to the audio speaker unit 110. In the above-described processing process, if the pressing button 113 is pressed at step S20, when an audio signal is output by communication or reproduction of a multimedia file, if the user contacts the audio speaker unit 110 with the ear so that the pressing button 113 is not pressed, the switching unit 160 maintains a state that outputs an audio signal to the audio speaker unit 110 (S60).

The conventional art relates to a mobile communication terminal including a bone conduction speaker and an audio speaker and including the bone conduction speaker that outputs an audio signal through the bone conduction speaker when a speaker is positioned at a position other than the ear by sensing the user's speaker contact position and a method of driving the same.

However, the conventional art has the following many problems.

That is, at the conventional art, at a front surface of the terminal, because a receiver hole (speaker unit) is provided, there is a large problem that cannot form an entire front surface of the terminal into a screen window.

Further, in the conventional art, because a vibrator does not attach to a liquid crystal screen or a front panel of the terminal, there is a large problem that an entire front surface of the terminal cannot receive sound.

Further, the conventional art has a problem that sound can be received only when close contacting a speaker portion with the ear, i.e., a problem that sound of high sensitivity cannot be received with a bone conduction function when close contacting the terminal with the ear or a periphery portion of the ear of the face.

Particularly, the conventional art has a problem that peripheral noise is together transferred while communicating, i.e., a large problem that only a communicating person's voice cannot be transmitted regardless of peripheral noise.

DISCLOSURE

Technical Problem

The present invention has been made in view of the above problems, and has a first object of providing a communication terminal having a bone conduction function that can include at least one bone conduction vibration receiver/speaker attached to an inner liquid crystal panel or a rear surface of a liquid crystal screen of the communication terminal (e.g., a smart phone, a Galaxy Tab, a Galaxy Phone, a mobile phone, a PDA, an MP3, an iPhone, an iPad, and a wireless set) and at least one bone conduction vibration no-noise microphone attached to an upper end portion of the inside of the communication terminal (e.g., a smart phone, a Galaxy Tab, a Galaxy Phone, a mobile phone, a PDA, an MP3, an iPhone, an iPad, and a wireless set), a second object of providing a communication terminal having a bone conduction function that can form an entire front surface of the terminal into a screen window and can enable various new designs by enlarging receiver hole space to a liquid crystal screen by removing a receiver hole (speaker) provided at the front surface of the conventional communication terminal (e.g., a smart phone, a Galaxy Tab, a Galaxy Phone, a mobile phone, a PDA, an MP3, an iPhone, an iPad, and a wireless set), a third object of providing a communication terminal having a bone conduction function that can improve a waterproof effect because the receiver hole (speaker) can be removed, a fourth object of providing a communication terminal having a bone conduction function that can receive sound at the entire front surface of the terminal by attaching a vibrator to a liquid crystal screen or a front panel of the terminal, a fifth object of providing a communication terminal having a bone conduction function that can receive sound of high sensitivity with a bone conduction function when close contacting with the terminal with an ear or a peripheral portion of an ear of a face, a sixth object of providing a communication terminal having a bone conduction function that can transmit only a communicating person's voice regardless of peripheral noise, and a seventh object of providing a communication terminal having a bone conduction function that can provide a good image to a consumer by greatly improving a quality and reliability of a product.

Technical Solution

In accordance with an aspect of the present invention, there is provided a communication terminal having a bone conduction function having at least one bone conduction vibration receiver/speaker attached to an inner liquid crystal panel or a rear surface of a liquid crystal screen of the communication terminal (e.g., a smart phone, a Galaxy Tab, a Galaxy Phone, a mobile phone, a PDA, an MP3, an iPhone, an iPad, and a wireless set) and for converting a sound signal (electrical signal) to a vibration so as to receive sound at an entire front surface of the communication terminal when close contacting the communication terminal with a face.

In accordance with another aspect of the present invention, there is provided a communication terminal having a bone conduction function having at least one bone conduction vibration no-noise microphone attached to an upper end portion of the inside of the communication terminal (e.g., a smart phone, a Galaxy Tab, a Galaxy Phone, a mobile phone, a PDA, an MP3, an iPhone, an iPad, and a wireless set) and for converting a micro vibration to a sound signal (electrical signal) so as to transmit only a communicating person's voice regardless of peripheral noise with a bone conduction microphone function when close contacting the communication terminal with a face.

Advantageous Effects

As described above, a communication terminal of the present invention includes at least one bone conduction vibration receiver/speaker attached to an inner liquid crystal panel or a rear surface of a liquid crystal screen of the communication terminal (e.g., a smart phone, a Galaxy Tab, a Galaxy Phone, a mobile phone, a PDA, an MP3, an iPhone, an iPad, and a wireless set) and at least one bone conduction vibration no-noise microphone attached to an upper end portion of the inside of the communication terminal (e.g., a smart phone, a Galaxy Tab, a Galaxy Phone, a mobile phone, a PDA, an MP3, an iPhone, an iPad, and a wireless set).

By removing a receiver hole (speaker) provided at a front surface of a conventional communication terminal (e.g., a smart phone, a Galaxy Tab, a Galaxy Phone, a mobile phone, a PDA, an MP3, an iPhone, an iPad, and a wireless set), the communication terminal according to the present invention having the above configuration can enlarge receiver hole space to a liquid crystal screen and can thus form an entire front surface of the terminal into a screen window.

Because the receiver hole (speaker) can be removed, a waterproof effect can be improved.

Particularly, by attaching a vibrator to a liquid crystal screen or a front panel, of the terminal, an entire front surface of the terminal can receive sound.

Further, when close contacting a terminal with an ear or a peripheral portion of an ear of a face, sound of high sensitivity can be received with a bone conduction function.

Further, only a communicating person's voice can be transmitted regardless of peripheral noise.

By greatly improving a quality and reliability of a product due to the above effect, the present invention can provide a good image and various convenience to a consumer.

BEST MODES FOR CARRYING OUT THE INVENTION

A communication terminal having a bone conduction function applied to the present invention may be formed, as shown in FIGS. 6 to 13.

Further, detailed descriptions of well-known functions and structures incorporated herein may be omitted to avoid obscuring the subject matter of the present invention.

The following terms are set in consideration of a function in the present invention and may be changed according to a producer's intention or custom and thus a definition thereof is made based on entire contents of this specification.

Figure 9:
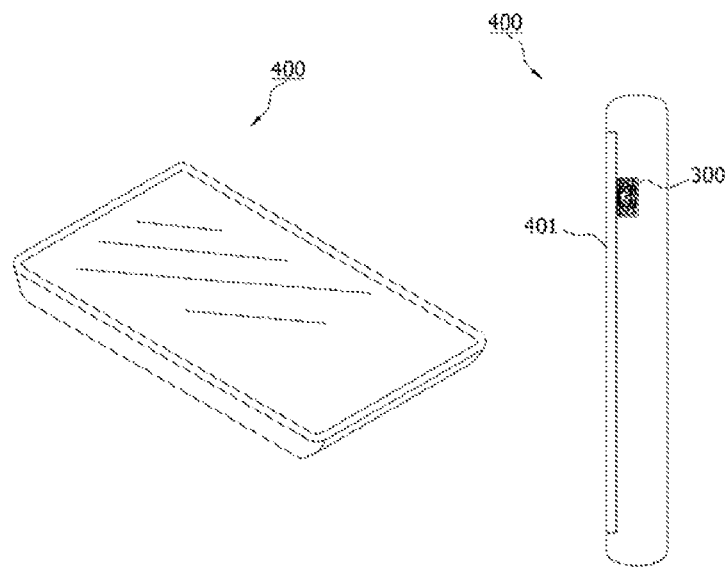
FIG. 9 is a view illustrating a state in which a bone conduction vibration receiver/speaker applied to the present invention is attached to a liquid crystal screen of a communication terminal.
Figure 10:
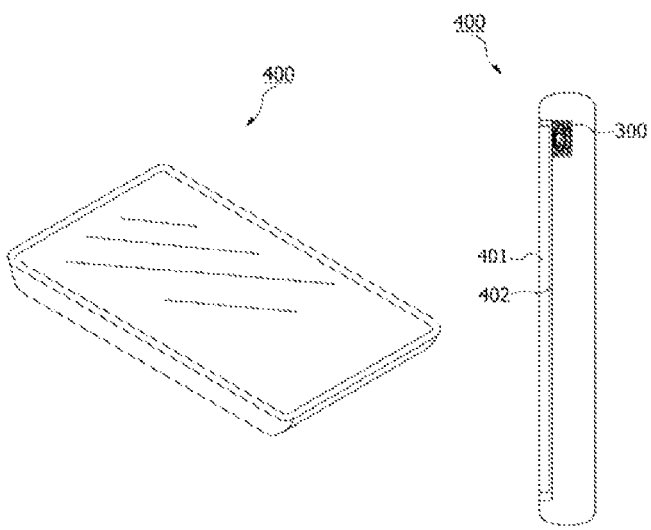
FIG. 10 is a view illustrating a state in which a bone conduction vibration receiver/speaker applied to the present invention is attached to a liquid crystal panel of a communication terminal.

First, as shown in FIGS. 9 and 10, a communication terminal of the present invention includes at least one bone conduction vibration receiver/speaker 300 attached to an inner liquid crystal screen 401 or a rear surface of a liquid crystal panel 402 of the communication terminal (e.g., a smart phone, a Galaxy Tab, a Galaxy Phone, a mobile phone, a PDA, an MP3, an iPhone, an iPad, and a wireless set) 400 and for converting a sound signal (electrical signal) to a vibration so as to receive sound at an entire front surface of the communication terminal when close contacting the communication terminal 400 with a face and is formed in a compact square or rectangular form.

Figure 1:
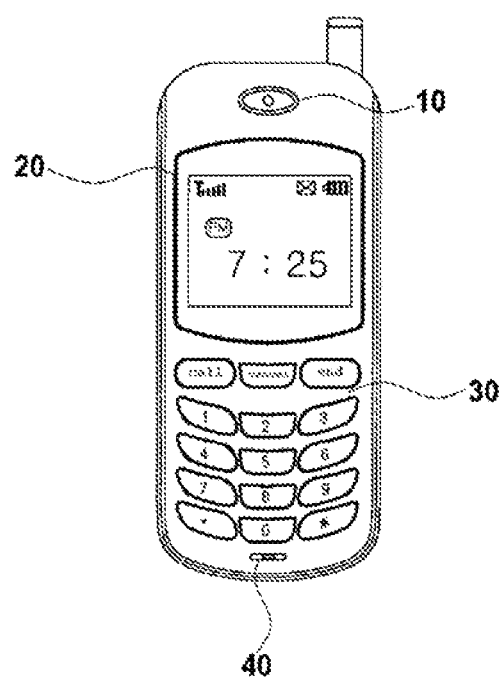
FIG. 1 is a front view of a conventional mobile communication terminal.
Figure 2:
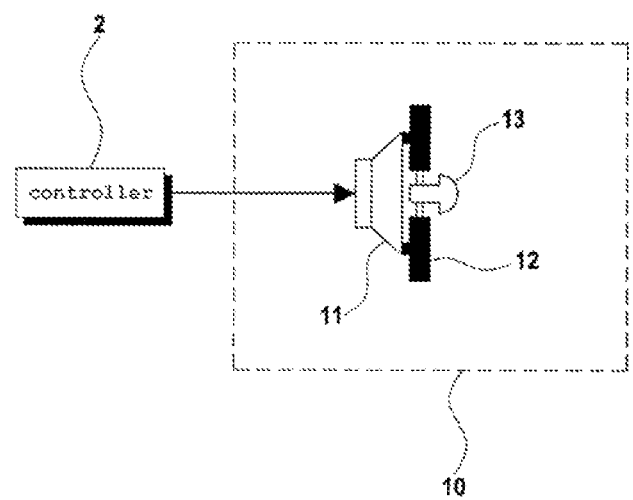
FIG. 2 is a circuit diagram illustrating a configuration of a conventional speaker.
Figure 3:
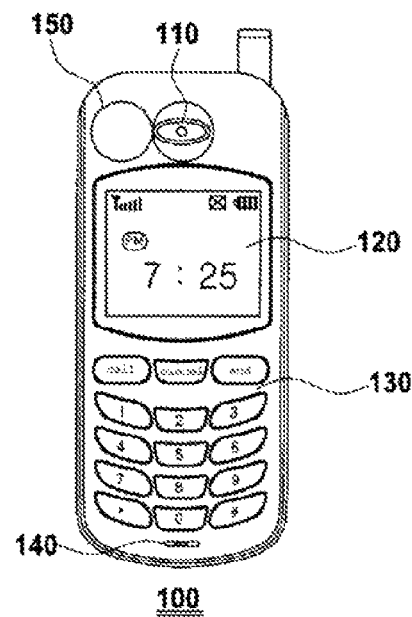
FIG. 3 is a front view of a mobile communication terminal having another conventional bone conduction speaker.
Figure 4:
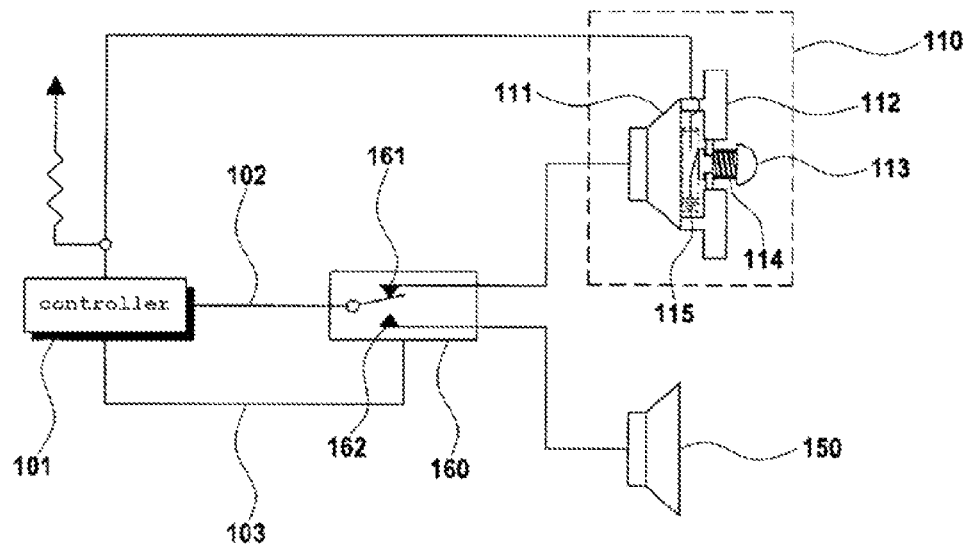
FIG. 4 is a block diagram illustrating a configuration of FIG. 3.
Figure 5:
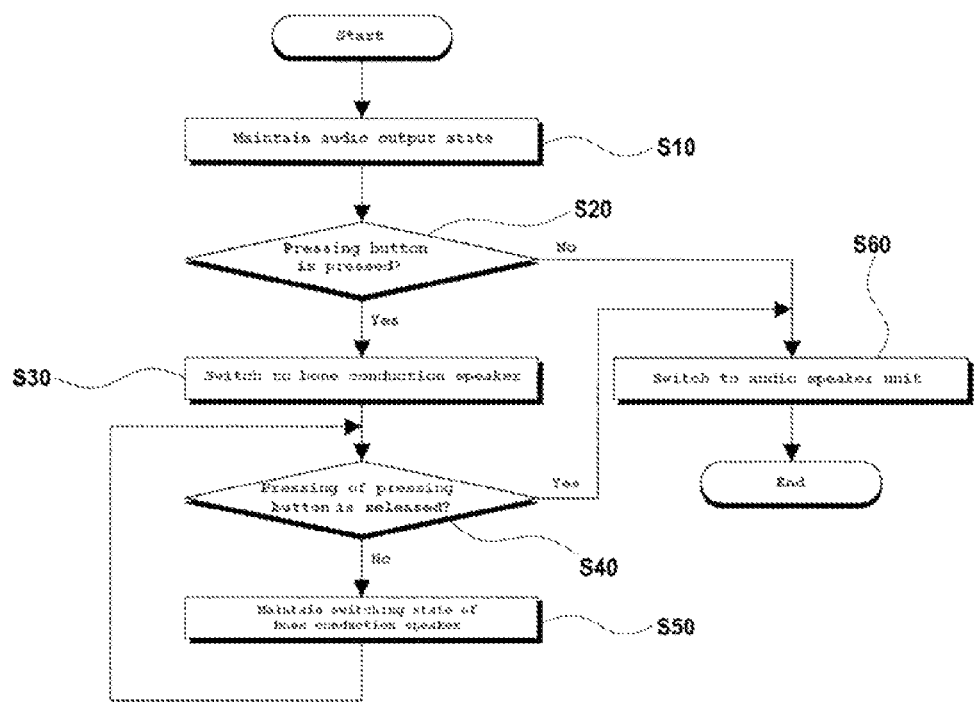
FIG. 5 is a flowchart illustrating a method of driving the terminal of FIG. 3.
Figure 6:
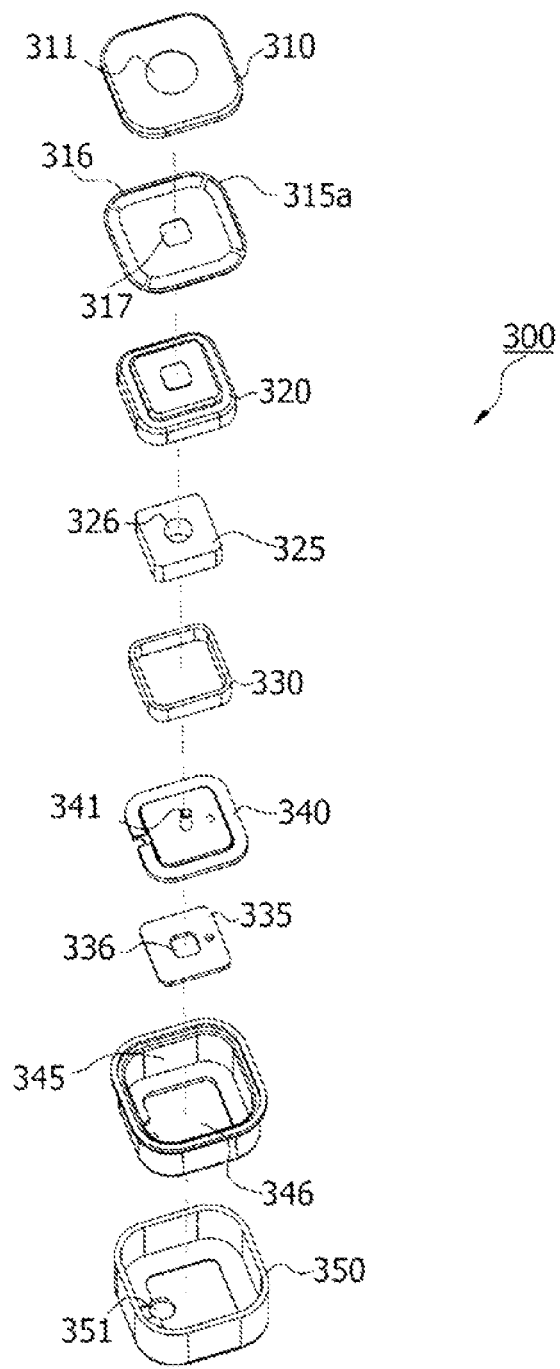
FIG. 6 is an exploded perspective view of a bone conduction vibration receiver/speaker applied to the present invention.
Figure 7:
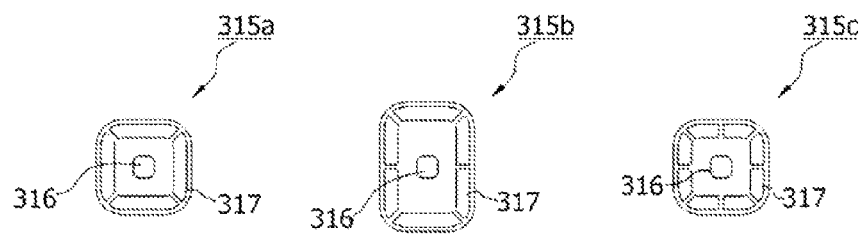
FIG. 7 is a diagram illustrating various shapes of a vibration spider (damper) applied to the present invention.
Figure 8:
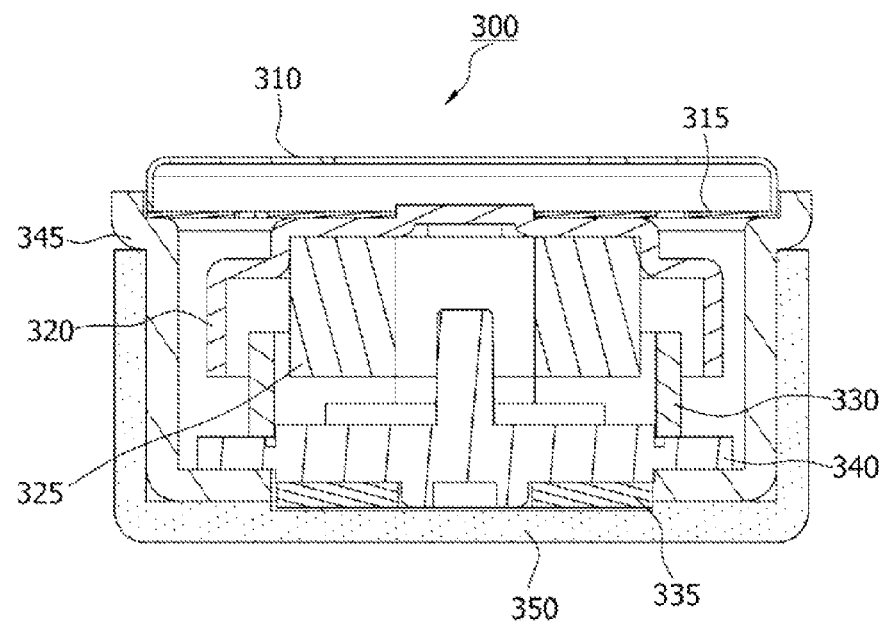
FIG. 8 is a cross-sectional view of a coupling state of a bone conduction vibration receiver/speaker applied to the present invention.

In this case, a detailed configuration of the bone conduction vibration receiver/speaker 300 is formed, as shown in FIGS. 6, 7, 8.

That is, a top cover 310 is attached to the liquid crystal screen 401 or the liquid crystal panel 402 and has a hole 311 at the center.

Further, at one end of the top cover 310, vibration spiders (damper) 315a, 315b, and 315c are assembled and have a vibration hole 317 to respond to a micro vibration by bone conduction at the outside about a hole 316 of the center.

The vibration spiders (damper) 315a, 315b, and 315c may be formed in various shapes, as shown in FIG. 7.

At one end of the vibration spiders (damper) 315a, 315b, and 315c, a yoke 320 is assembled and installed.

Further, at one end of the yoke 320, a magnet 325 is assembled and has a hole 326 at the center.

Further, at one end of the magnet 325, a voice coil 330 is assembly and installed.

At one end of the voice coil 330, a bottom cover 340 is assembled and has a protrusion 341 protruded to an upper portion.

Further, at one end of the bottom cover 340, a PCB 335 is assembled and has a hole 336 at the center.

At one end of the PCB 335, a frame 345 is assembled and has a hole 346 at the center.

Finally, at one end of the frame 345, a rubber cover 350 is provided, and at one side of the rubber cover 350, a hole 351 is formed, and when using a bone conduction vibration receiver/speaker, the rubber cover 350 absorbs a vibration emitted to the outside from a rear surface of the vibrator, and when using a vibration no-noise microphone, the rubber cover 350 blocks vibration transfer noise that enters from the outside.

Particularly, it is preferable that the voice coil 330 applied to the present invention is formed by winding a coil of 0.06 to 1.0 mm in a structure of 4 to 6 layers.

Further, it is preferable that the voice coil 330 is formed with a low impedance coil of 4 to 16Ω.

Figure 13:
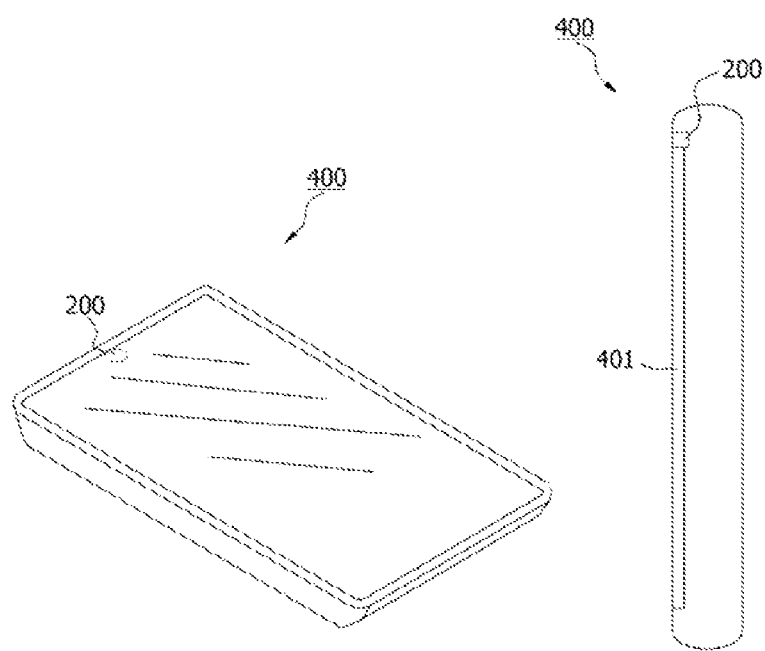
FIG. 13 is a view illustrating a state in which a bone conduction vibration no-noise microphone applied to the present invention is attached to an upper end portion of the inside of a communication terminal.

As shown in FIG. 13, a communication terminal of the present invention includes at least one bone conduction vibration no-noise microphone 200 attached to an upper end portion of the inside of the communication terminal (e.g., a mobile phone, a PDA, an MP3, and an iPad) 400 and for converting a micro vibration to a sound signal (electrical signal) so as to transmit only a communicating person's voice regardless of peripheral noise with a bone conduction no-vibration microphone function when close contacting the communication terminal 400 with a face and is formed in a compact square or rectangular form.

Figure 11:
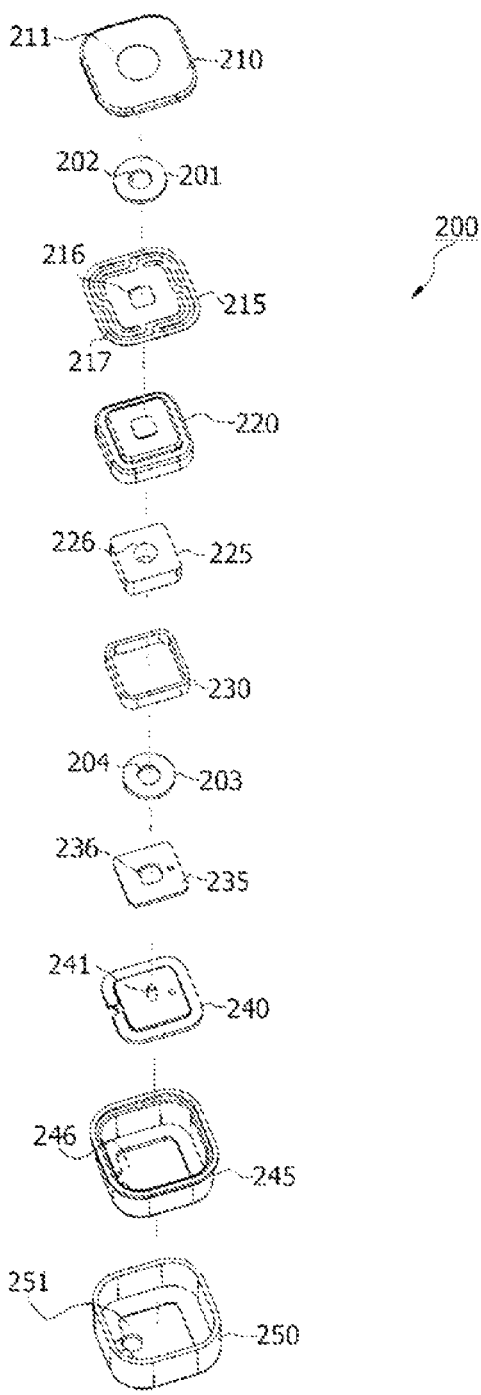
FIG. 11 is an exploded perspective view of a bone conduction vibration no-noise microphone applied to the present invention.
Figure 12:
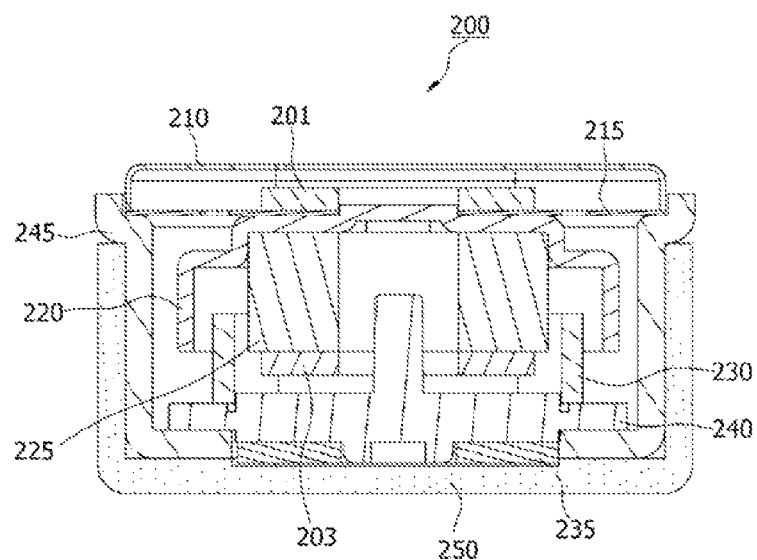
FIG. 12 is a cross-sectional view illustrating a coupling state of a bone conduction vibration no-noise microphone applied to the present invention.

In this case, a detailed configuration of the bone conduction vibration no-noise microphone 200 is formed, as shown in FIGS. 11 and 12.

That is, a top cover 210 is attached to an upper end portion of the inside of the communication terminal 400 and has a hole 211 at the center.

Further, at one end of the top cover 210, a first inside cushion 201 is assembled, has a hole 202 at the center, and performs a buffer function of an external signal.

A vibration spider (damper) 215 is assembled at one end of the inside cushion 201 to perform a buffer function of a large external signal and has a vibration hole 217 formed to respond to a micro vibration by bone conduction at the outside about a central hole 216 of the center.

Further, at one end of the vibration spider (damper) 215, a yoke 220 is assembled and installed.

At one end of the yoke 220, a magnet 225 is assembled and has a hole 226 at the center.

Further, at one end of the magnet 225, a voice coil 230 is assembled and installed.

At one end of the voice coil 330, a second inside cushion 203 is assembled and performs a buffer function of a large external signal using the second inside cushion 203 having a hole at the center.

Further, at one end of the second inside cushion 203, a PCB 235 is assembled and has a hole 236 at the center.

At one end of and the PCB 235, a bottom cover 240 is assembled and has a protrusion 241 protruded to an upper portion.

Further, a frame 245 is assembled at one end of the bottom cover 240 and has a hole 246 at the center.

Finally, a rubber cover 250 is provided at one end of the frame 245, has a hole 251 at one side, absorbs a vibration emitted to the outside from a rear surface of a vibrator when using a bone conduction vibration receiver/speaker, and blocks vibration transfer noise that enters from the outside when using a vibration no-noise microphone.

Particularly, it is preferable that the voice coil 230 applied to the present invention is formed by winding a coil of 0.02 to 0.06 mm in a structure of 8 to 10 layers.

It is preferable that the voice coil 230 is formed with a high impedance coil of 150 to 200Ω.

When applying the configuration of the present invention, the configuration may be variously changed and have various forms.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

An operation and function of a communication terminal having a bone conduction function according to the present invention having the above-described configuration will be described.

In the present invention, by removing a receiver hole (speaker) provided at a front surface of a conventional communication terminal (e.g., a smart phone, a Galaxy Tab, a Galaxy Phone, a mobile phone, a PDA, an MP3, an iPhone, an iPad, and a wireless set), an entire front surface of the terminal can be formed in a screen window, and particularly, by attaching a vibrator to a liquid crystal screen or a front panel of the terminal, the entire front surface of the terminal can receive sound, and when close contacting the terminal with an ear or a peripheral portion of an ear of a face, the terminal can receive sound of high sensitivity with a bone conduction function and can transmit only a communicating person's voice regardless of peripheral noise.

For this purpose, when sequentially coupling parts shown in FIGS. 6 and 7, the bone conduction vibration receiver/speaker 300 applied to the present invention is assembled as shown in FIG. 8, and by forming a existing circular shape in a quadrangular shape, the bone conduction vibration receiver/speaker 300 can be formed in a compact structure, and when inserting into a groove without a jig, the bone conduction vibration receiver/speaker 300 can be simply assembled and installed and thus productivity can be improved.

As shown in FIG. 9, when attaching and using the bone conduction vibration receiver/speaker 300 assembled as described above to a rear surface of the liquid crystal screen 401 of the communication terminal 400, a receiving receiver positioned at an upper end portion of the mobile phone can be removed, and thus by enlarging space of a receiving receiver to a liquid crystal screen, a screen larger than a present screen can be formed and used.

As shown in FIG. 10, when attaching and using the bone conduction vibration receiver/speaker 300 to a rear surface of liquid crystal panel 402 of the communication terminal 400, a conventional receiver hole for transferring sound can be removed and thus a waterproof effect can be improved.

Particularly, the present invention is used by attaching the bone conduction vibration receiver/speaker 300 to the liquid crystal screen 401 or the liquid crystal panel 402 of the communication terminal 400, a front surface entire of the communication terminal 400 can receive sound (air conduction), and when close contacting the communication terminal 400 with a face, the present invention can receive sound with a bone conduction function.

Further, it is preferable that the voice coil 330 applied to the present invention is formed by winding a coil of 0.06 to 1.0 mm in a structure of 4 to 6 layers.

That is, when the coil is 0.06 mm or less, the coil is so thin and may be thus cut, and when the coil is 1.0 mm or more, there is a problem that a sound signal is deteriorated.

When the coil is formed in 4 layers or less, an insecure electrical signal occurs, and when the coil is formed in 6 layers or more, a cost increases, and thus it is preferable that the voice coil 330 is formed by winding a coil of 0.06 to 1.0 mm in a structure of 4 to 6 layers.

Further, it is preferable that the voice coil 330 is formed with a low impedance coil of 4-16o, and when impedance is 4o or less, it is difficult to perform impedance matching with a driving amplifier, and when impedance is 16o or more, a high output driving amplifier is necessary and thus it is preferable that the voice coil 330 is formed with a low impedance coil of 4-16o.

Further, it is preferable that the voice coil 330 is formed with a low impedance coil of 4 to 16Ω, and when impedance is 4Ω or less, a current response is so slow, and when impedance is 16Ω or more, a current response is so fast and thus transmission is impossible, whereby it is preferable that the voice coil 330 is formed with a low impedance coil of 4 to 16Ω.

The bone conduction vibration no-noise microphone 200 applied to the present invention is assembled as shown in FIG. 12 by sequentially coupling parts shown in FIG. 11, and by forming an existing circular shape into a quadrangular shape, the bone conduction vibration no-noise microphone 200 may be formed in a compact structure, and when the bone conduction vibration no-noise microphone 200 is inserted into a groove without a jig, the bone conduction vibration no-noise microphone 200 can be simply assembled and installed and thus productivity can be improved.

As shown in FIG. 13, the bone conduction vibration no-noise microphone 200 assembled as described above is used by attaching to a rear surface of the liquid crystal screen 401 of the communication terminal 400, and in a state in which the bone conduction vibration no-noise microphone 200 is attached to an upper end portion of the communication terminal 400, when a communicating person communicates by close contacting this portion with a face, the bone conduction vibration no-noise microphone 200 can transmit only communicating person's voice regardless of peripheral noise with a bone conduction microphone function.

Particularly, it is preferable that the voice coil 230 applied to the bone conduction vibration no-noise microphone 200 applied to the present invention is formed by winding a coil of 0.02 to 0.06 mm in a structure of 8 to 10 layers.

That is, when the coil is 0.02 mm or less, the coil is so thin and may be thus cut, and when the coil is 0.06 mm or more, there is a problem that a sound signal is deteriorated.

When the coil is formed in 8 layers or less, an insecure electrical signal occurs, and when the coil is formed in 10 layers or more, a cost increases, and thus it is preferable that the voice coil 230 is formed by winding a coil of 0.02 to 0.06 mm in a structure of 8 to 10 layers.

Further, it is preferable that the voice coil 230 applied to the present invention is formed with a high impedance coil of 150-200o, and when impedance is 150o or less, an electromotive force (voltage) induced to a voice coil is slow, and when impedance is 200o or more, an induced electromotive force (voltage) is appropriate, but economic efficiency is largely deteriorated, and thus it is preferable that the voice coil 230 is formed with a high impedance coil of 150-200o.

INDUSTRIAL APPLICABILITY

A communication terminal having a bone conduction function according to the present invention can actually repeatedly obtain the same result, and the present invention promotes technical development and contributes to industrial development and thus has an enough value to protect.

The invention claimed is:

1. A communication terminal, comprising:
a display including at least one of a liquid crystal screen or a liquid crystal panel; and
a bone conduction vibration receiver/speaker for converting a sound signal to a vibration, the bone conduction vibration receiver/speaker attached to the liquid crystal screen or the liquid crystal panel,
wherein the bone conduction vibration receiver/speaker comprises:
a top cover formed in a compact square or round type form, attached to the liquid crystal panel or the liquid crystal screen, and having a first hole at the center;
a vibration spider assembled at one end of the top cover, and having a second hole of the center and a vibration hole to respond to a micro vibration by bone conduction at the outside about the second hole;
a yoke assembled at one end of the vibration spider;
a magnet assembled at one end of the yoke and having a third hole at the center;
a voice coil assembled at one end of the bottom PCB or bottom cover;
a bottom cover assembled at one end of the voice coil and having a protrusion protruded to an upper portion;
a PCB assembled at one end of the bottom cover and having a fourth hole at the center;
a frame assembled at one end of the PCB and having a fifth hole at the center; and
a rubber cover provided at one end of the frame and having a sixth hole at one side and for absorbing a vibration that emits the outside from a rear surface of a vibrator when using the bone conduction vibration receiver/speaker and for blocking vibration transfer noise that enters from the outside when using a vibration no-noise microphone,
wherein the liquid crystal screen or the liquid crystal panel is fixed to a housing of the communication terminal,
wherein the bone conduction vibration receiver/speaker is vibrated by the vibration spider and generates the micro vibration, and
wherein the bone conduction vibration receiver/speaker transfers the generated micro vibration to the liquid crystal screen or the liquid crystal panel.

2. The communication terminal of claim 1, wherein the voice coil 330 is formed by winding a coil of 0.06 to 1.0 mm in a structure of 4 to 6 layers.

3. The communication terminal of claim 2, wherein the voice coil 330 is formed with a low impedance coil of 4 to 16Ω.

4. A communication terminal, comprising:
a display including a liquid crystal screen; and
a bone conduction vibration no-noise microphone for converting a micro vibration to a sound signal, the bone conduction vibration no-noise microphone attached to an upper end portion of the liquid crystal screen,
wherein the bone conduction vibration no-noise microphone comprises:
a top cover formed in a compact square or round type form, attached to the upper end portion of the liquid crystal screen, and having a first hole at the center;
a first inside cushion assembled at one end of the top cover and having a second hole at the center and for performing a buffer function of an external signal;

a vibration spider assembled at one end of the inside cushion and having a third hole at the center and a vibration hole to respond to a micro vibration by bone conduction at the outside about a third hole;

a yoke assembled at one end of the vibration spider;

a magnet assembled at one end of the yoke and having a fourth hole at the center;

a voice coil assembled at one end of the upper PCB bottom;

a second inside cushion assembled at one end of the voice coil and having a fifth hole at the center and for performing a buffer function of an external signal;

a PCB assembled at one end of the second inside cushion and having a sixth hole at the center;

a bottom cover assembled at one end of the PCB and having a protrusion protruded to an upper portion;

a frame assembled at one end of the bottom cover and having a seventh hole at the center; and a rubber cover provided at one end of the frame, having a eighth hole at one side and for absorbing a vibration that emits the outside from a rear surface of a vibrator when using a bone conduction vibration receiver/speaker and for blocking vibration transfer noise that enters from the outside when using the vibration no-noise microphone, wherein the liquid crystal screen is fixed to a housing of the communication terminal, wherein the bone conduction vibration no-noise microphone is vibrated by the vibration spider and generates the micro vibration, and wherein the bone conduction vibration no-noise microphone converts the generated micro vibration to the sound signal without transferring the generated micro vibration to the liquid crystal screen.

5. The communication terminal of claim 4, wherein the voice coil 230 is formed by winding a coil of 0.02 to 0.06 mm in a structure of 8 to 10 layers.

6. The communication terminal of claim 4, wherein the voice coil 230 is formed with a high impedance coil of 150 to 200Ω.

* * * * *